Patented June 29, 1948

2,444,237

UNITED STATES PATENT OFFICE 2,444,237

COMPOSITE PIGMENTS

Leif Aagaard, Red Bank, N. J., and Winfred J. Cauwenberg, Piney River, Va., assignors to American Cyanamid Company, New York, N. Y., a corporation of Maine No Drawing. Application August 29, 1946, Serial No. 693,825

2 Claims. (Cl. 106—300)

This invention relates to extended titanium oxide pigments and relates more particularly to composite titanium oxide-calcium sulfate pigments.

It is an object of the invention to provide a method of preparing composite titanium oxide-calcium sulfate pigments having exceptional hiding power, tinting strength, gloss, and texture.

An additional object of the invention resides in the provision of a method whereby the calcium sulfate extender, in the gypsum modification thereof, is formed in situ while the inherent undesirable growth of the gypsum crystals to disproportionate size is prevented.

Further objects of the invention will be apparent to those skilled in the art from the following detailed description of preferred embodiments thereof.

It has been found that composite titanium oxide-calcium sulfate pigments, containing in excess of about 15% $TiO_2$ and preferably containing from about 25% to about 75% $TiO_2$ and from about 75% to about 25% $CaSO_4$, may be prepared by the addition of CaO or $Ca(OH)_2$ to an aqueous sulfuric acid slurry of uncalcined hydrated titanium oxide. The titanium oxide present in the aqueous sulfuric acid inhibits crystal growth of the gypsum, and the resultant composite precipitate may be calcined to produce a composite pigment having very uniform particle size and exceptional color, hiding power, gloss, and texture characteristics.

The hydrated $TiO_2$ employed in carrying out the method of the invention may be obtained from any convenient source. For purposes of illustration the following specific examples are directed to the use of hydrated $TiO_2$ obtained by the conventional thermal hydrolysis of clarified liquors from the sulfuric acid digestion of titanium-bearing ores.

Example 1

To 246 gm. of moist hydrated $TiO_2$, containing 66 gm. of hydrated $TiO_2$, were added 66 gm. of a rutile seed slurry containing 4 gm. of a rutile seeding agent, 141 cc. (258.6 gm.) of 93% $H_2SO_4$ and 859 cc. of water. The resulting slurry contained approximately 70 gm. of hydrated $TiO_2$ and 18% $H_2SO_4$. The mixture was treated with 91 gm. of $Ca(OH)_2$ suspended in 950 cc. of water. The precipitate was dewatered and washed with 2000 cc. of water saturated with calcium sulfate. The washed filter cake was treated with a small amount of $K_2CO_3$ and dried at 130° C. The dried material was calcined for 40 minutes at 975° C., the temperature having been gradually raised to that point. The pigment so produced had exceptionally good color and a tinting strength of 590. The pigment contained 31.7% $TiO_2$ and 68.3% $CaSO_4$.

Example 2

To 276 gm. of moist hydrated $TiO_2$ pulp containing 68 gm. of hydrated $TiO_2$, were added 66 gm. of a rutile seed slurry containing 4 gm. of a rutile seeding agent, and 141 cc. (258.6 gm.) of 93% $H_2SO_4$. The resulting slurry contained approximately 72 gm. of hydrated $TiO_2$ and 48% $H_2SO_4$. The mixture was treated with 91 gm. of $Ca(OH)_2$ suspended in 950 cc. of water. The precipitate was dewatered and washed with 2000 cc. of water saturated with calcium sulfate. The washed filter cake was mixed with a small amount of $K_2CO_3$ and dried at 130° C. The dried material was calcined for 1 hour at 975° C. The pigment produced had very good color characteristics and a tinting strength of 600. The material contained 31% $TiO_2$ and 69% $CaSO_4$.

Example 3

To 172 cc. (315.4 gm.) of 93% $H_2SO_4$ were added 454 gm. of moist hydrated $TiO_2$ pulp, containing 133 gm. of hydrated $TiO_2$ and a small amount of a rutile seeding agent. The resulting slurry contained approximately 150 gm. of hydrated $TiO_2$ and 44% $H_2SO_4$. The mixture was treated with 1780 gm. of lime slurry, containing 178 gm. of $Ca(OH)_2$. The precipitate was washed with 4000 cc. of water saturated with calcium sulfate. The washed filter cake was mixed with a small amount of $K_2CO_3$ and dried at 130° C. The dried material was calcined for 1 hour at 975° C. The pigment so produced contained 30% $TiO_2$ and 70% $CaSO_4$. The pigment had good color, although it was very slightly yellow, and had a tinting strength of 580.

Example 4

To 334 gm. of 93% $H_2SO_4$ were added 217 gm. of a hydrated $TiO_2$ slurry, containing 55 gm. of $TiO_2$, and 188 gm. of an aqueous slurry containing 13 gm. of a rutile seeding agent. The resulting slurry contained approximately 60 gm. of hydrated $TiO_2$ and 46% $H_2SO_4$. To this mixture was added 2212 gm. of lime slurry, containing 188 gm. of $Ca(OH)_2$. The precipitate was filtered and washed with water saturated with calcium sulfate, mixed with a small amount of $K_2CO_3$, and the material was dried at 150° C. The dried material was calcined for 45 minutes at 975° C. Calcination was started at 700° C.

and the temperature was raised to 975° over a period of about 4½ hours. The calcined material contained 15% TiO$_2$ and 85% CaSO$_4$. The so-produced pigment had good color characteristics and a tinting strength of 320.

*Example 5*

1840 gm. of a slurry of hydrated TiO$_2$, containing 644 gm. of TiO$_2$ and 2½% of a rutile seeding agent, were mixed with 551 gm. of 93% H$_2$SO$_4$. The resulting slurry contained approximately 690 gm. of hydrated TiO$_2$ and 30% H$_2$SO$_4$. To this mixture was added 350 gm. of lime suspended in 1750 cc. of water. The precipitate was filtered and washed with water saturated with calcium sulfate, and was thereafter mixed with a small amount of K$_2$CO$_3$ and dried at 150° C. The dried material was calcined for 30 minutes at 975° C., calcination having been started at 700° C. and the temperature raised over a period of 4½ hours. The resulting material contained 51.9% TiO$_2$ and 48.1% CaSO$_4$. The so produced pigment had very good color characteristics and a tinting strength of 1010.

*Example 6*

551 gm. of 93% H$_2$SO$_4$ was mixed with 920 gm. of a hydrated TiO$_2$ slurry, containing 276 gm. of TiO$_2$. The resulting slurry contained approximately 43% H$_2$SO$_4$. To this mixture was added 350 gm. of lime suspended in 1750 cc. of water. The precipitate was filtered and washed with water saturated with calcium sulfate and the material was thereafter mixed with a small amount of K$_2$CO$_3$ and dried at 150° C. The dried material was calcined for 30 minutes at 925° C., calcination having been started at 700° and the temperature raised over a period of 4 hours. The composite pigment so obtained contained 29.3% TiO$_2$, having an anatase crystal structure, and 70.7% CaSO$_4$. The pigment had very good color characteristics and a tinting strength of 470.

It will be noted that the concentration of sulfuric acid is maintained at or below 50%. When acid concentrations in excess of 50% are employed, the anhydrite crystal modification of calcium sulfate is produced. For pigment purposes, gypsum is much more desirable than anhydrite because of its superior hiding power, resistance to water after calcination, and other characteristics. Moreover, the use of dilute sulfuric acid slurries, which preferably have a sulfuric acid concentration of 15-50%, represents an important saving in sulfuric acid over the comparatively greater acid concentrations required for the production of anhydrite. The calcium sulfate-forming reaction is also preferably carried out at relatively low temperatures, as for example room temperature, to prevent any formation of anhydrite, although temperatures as high as from about 70° C. to about 80° C. may be employed if desired.

By precipitating calcium sulfate in a relatively dilute sulfuric acid slurry of hydrated titanium oxide, in accordance with the present invention, two important advantages are simultaneously obtained. Excessive growth of the gypsum crystals is prevented by the hydrated titanium dioxide, thus producing better pigment properties in the gypsum, while the relatively fine particle size of the previously formed hydrated titanium dioxide precipitate is not disturbed. The present invention can therefore be practiced by first precipitating titanium oxide of controlled particle size by thermal hydrolysis of clarified liquors from the sulfuric acid digestion of titanium-bearing ores in the usual manner, with or without the use of a seeding or nucleating agent, and the particle size and crystal structure of the hydrolysate may thereby be independently regulated. The resulting hydrolysate is then employed to control the particle size of the calcium sulfate crystals, and thus a composite titanium oxide-calcium sulfate pigment of improved color characteristics, tinting strength, gloss, and hiding power is obtained.

It will also be apparent from the aforegoing illustrative examples that the titanium dioxide of the composite pigment of this invention may have either anatase or rutile crystal structure depending on the presence or absence of a rutile seeding agent in the calcination mixture.

What we claim is:

1. A method of preparing a composite titanium oxide-calcium sulfate pigment which comprises precipitating calcium sulfate in the presence of uncalcined hydrated titanium oxide by adding lime to a slurry of said titanium oxide in aqueous sulfuric acid of less than 50% concentration, said titanium oxide and said lime being present in amounts such that the resulting composite precipitate will contain from about 15% to about 75% titanium oxide and from about 85% to about 25% calcium sulfate, water washing the composite precipitate, and calcining the precipitate.

2. A method of preparing a composite titanium oxide-calcium sulfate pigment which comprises thermally hydrolyzing clarified liquor obtained by the sulfuric acid digestion of titanium-bearing ore, water washing the precipitated hydrated titanium oxide, slurrying the substantially pure hydrated titanium oxide with aqueous sulfuric acid, said aqueous sulfuric acid having a concentration of less than 50%, adding lime to the slurry in such amount that the resulting composite precipitate will contain from about 15% to about 75% titanium oxide and from about 85% to about 25% calcium sulfate, water washing the composite precipitate, and calcining the precipitate.

LEIF AAGAARD.
WINFRED J. CAUWENBERG.

REFERENCES CITED

The following references are of record in the file of this patent:

UNITED STATES PATENTS

| Number | Name | Date |
|---|---|---|
| 2,177,250 | Hanahan | Oct. 24, 1939 |
| 1,361,866 | Jebsen | Dec. 14, 1920 |

FOREIGN PATENTS

| Number | Country | Date |
|---|---|---|
| 346,801 | Great Britain | Apr. 13, 1931 |
| 149,316 | Great Britain | June 16, 1921 |